Figure 6:
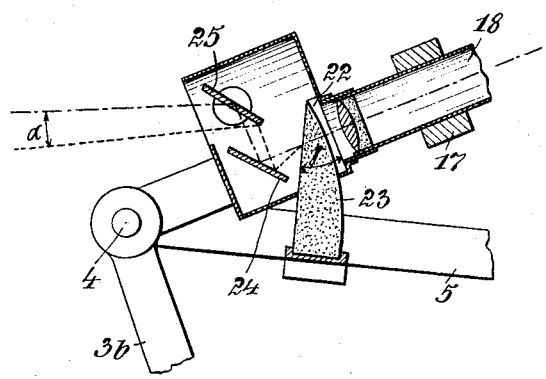

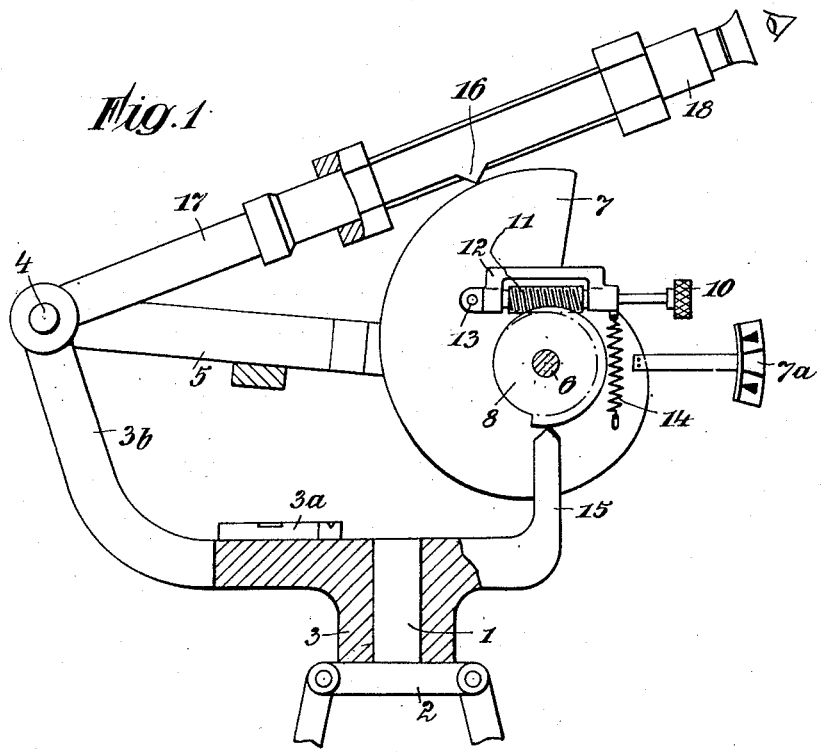
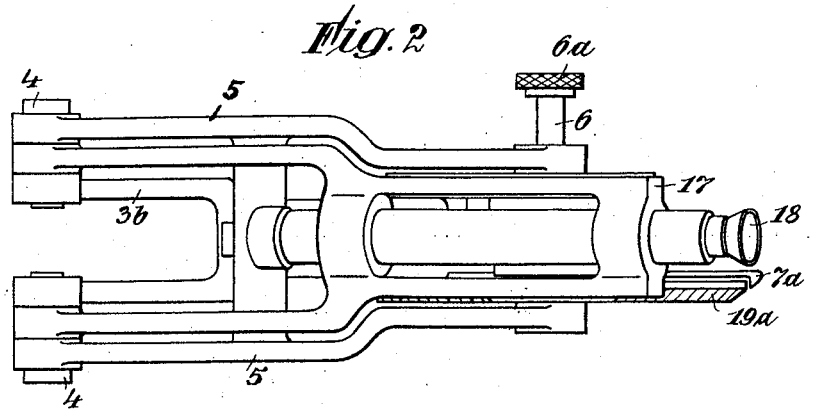

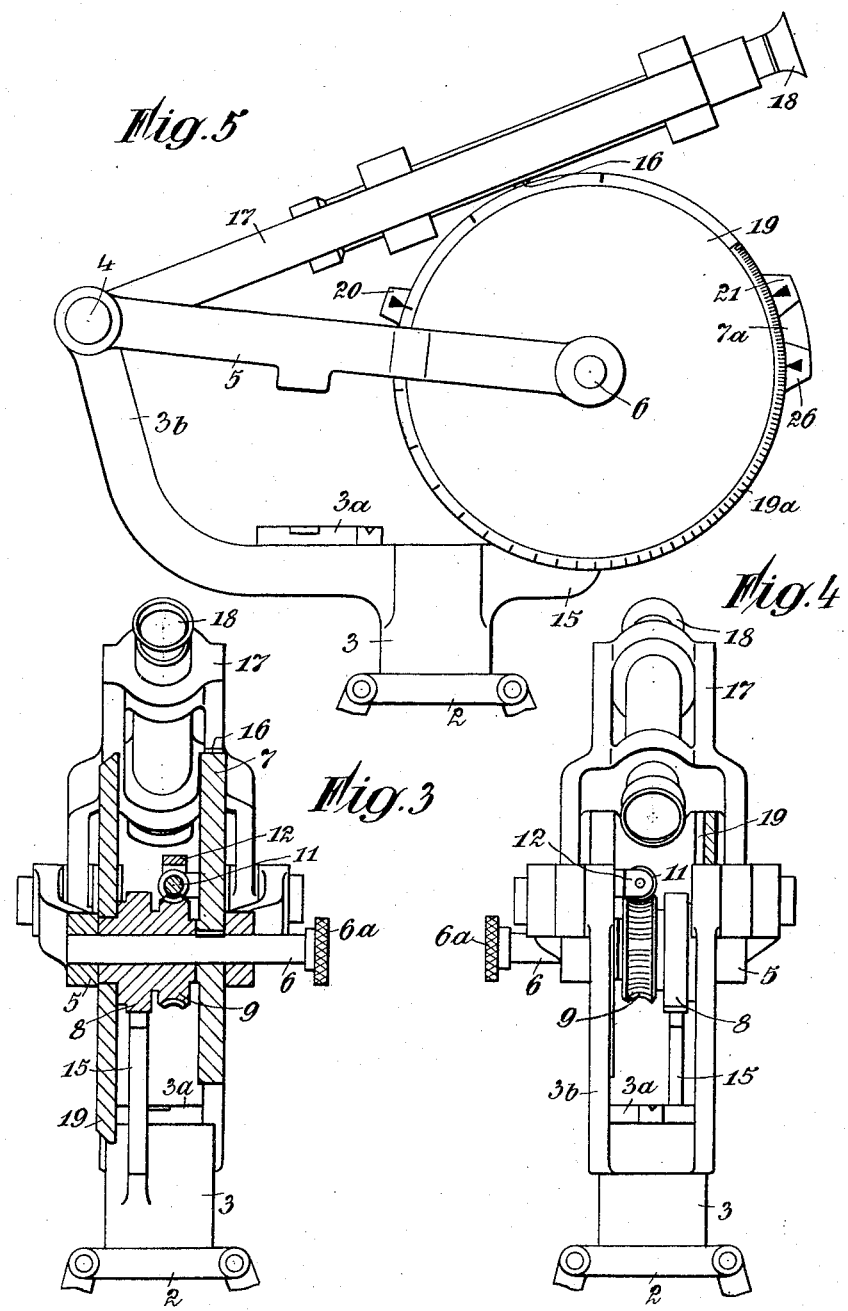

June 18, 1929.  K. PETSCHENIG  1,718,071
RANGE FINDER
Filed Oct. 28, 1925  3 Sheets-Sheet 3

Patented June 18, 1929.

1,718,071

UNITED STATES PATENT OFFICE.

KARL PETSCHENIG, OF VIENNA, AUSTRIA, ASSIGNOR TO THE FIRM C. P. GOERTZ, OPTISCHE ANSTALT, AKTIENGESELLSCHAFT, AKCIOVA SPOLECMOST K. P. GOERZ, OPTICKY USTAV, OF BRATISLAVA, CZECHOSLOVAKIA.

RANGE FINDER.

Application filed October 28, 1925, Serial No. 65,441, and in Germany November 6, 1924.

The present invention relates to such instruments which have for their object to determine from any point of observation on the coast the distance of a target floating on the sea surface either the known elevation of the point of observation above the sea level, or if such elevation is not sufficiently great a given height on the target itself serving as the basis of the measurement.

Range finders using as a measuring basis the known elevation of the point of observation above the sea level are indeed known, but heretofore they could be used only in a single elevation of the point of observation namely in that for which their range scale had been calculated.

The instrument constructed in accordance with the present invention differs from these known instruments in that it can be used in any elevation above the sea level provided the latter exceeds a certain amount dependent on the exactness of measurement of the greatest ranges or distances to be determined the elevation above the sea level serving as the measuring basis, and permits to take into account the curvature of the surface of the sea and the average refraction, while with smaller elevations of the point of observation the instrument can be used as a range finder having its measuring basis at the target, that is to say with known heights of the target.

According to the invention this advantage is obtained by that for adjusting the sight line, when the elevation above the sea level is used as a measuring basis as well as for adjusting the glass prism angle when the height of the target is used as a measuring basis, a cam supporting the telescope is made use of, the radii of which are exponential functions of the angles of turning the cam.

The latter angles are thus not read on a uniform circular scale as in the case of the known instrument, but on a logarithmic circular scale serving as the range scale which at the same time, when the division parameter is properly selected may be used as an elevation scale with a suitably reduced unit of length, if not a separate division is desired for the elevation scale. For taking into account the curvature of the surface of the sea and the average refraction this circular division is rigidly connected to a second cam which is rotatable relatively to the first cam and can be adjusted by means of a pointer according to the elevation above the sea level and locked in any adjusted position its periphery bearing against a stationary knife edge support, so that any turning of the cam for sighting the water line target, the angle of dispart will appear as a function of the sum of the radii of the points of support of both cams.

The subject matter of the invention is illustrated in the annexed drawing by way of example in an embodiment.

Figure 7:
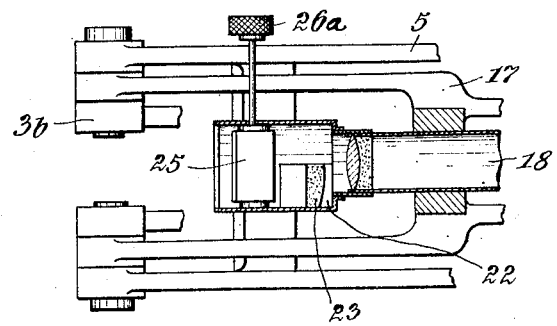

Fig. 1 shows the side elevation partly in section and Fig. 2 the plan view,

Fig. 3 the rear elevation partly in section,

Fig. 4 the front elevation,

Fig. 5 the side elevation with scale and pointer,

Fig. 6 the side elevation with the glass prism and pair of mirrors in section and Fig. 7 a plan view of Fig. 6 partly in section.

As shown in Figs. 1 and 2 an arm 3 provided with a level 3ª, is rotatably mounted on the vertical journal pin 1 of a tripod head 2. The bifurcated end 3ᵇ of the said arm carries the two coaxial trunnions 4 on which firstly the bifurcated link 5 is rotatably mounted which carries a journal pin 6 parallel to the horizontal axis of the trunnions 4 on which the cam 7 is keyed and which can be turned by means of a handle 6ª (Figs. 3, 4). Adjacent to the cam 7, the cam 8 is rotatably mounted on the journal pin 6 and provided with a worm wheel 9 into which engages a worm 11 adapted to be rotated by a handle 10. This worm is rotatably mounted in a yoke 12, for readily disengaging the worm from the worm wheel, this yoke is pivoted on a pin 13 secured to the cam 7 and at the other end so acted upon by a spring 14 secured to the cam 7 that the worm engages into the worm wheel without lost motion. The cam 8 bears at its periphery against a knife edge 15 of the arm 3 parallel to the axis of the journal pin 6 while the periphery of the cam 7 serves to support the knife edge 16 of a bifurcated lever 17 journalled on the pair of trunnions 4 and carrying the sighting telescope 18 the optical axis of which is so arranged that it intersects the trunnion axis 4 at right angles in the central plane of the bifurcated end 3ᵇ of the arm 3. Adjacent and secured to the cam 8 there is provided a circular disc 19 (Fig. 3) carrying at its circumference a logarithmic circular division 19ª (Fig. 5) similar to the division of a calculating rule wound on the periphery of a circle. The numbering of this circular division gives, on reading by means of the pointer 20 secured to the link 5, directly, the range or distance sought of the target. By properly selecting the parameter of the range division and if the numbering is in proper units, for instance, in hundreds of metres, then the same division being of a logarithmic character, may also be used as an elevation scale for adjusting the elevation above the sea level by means of the arm 7ª carrying a pointer 21 and secured to the cam 7, the numbering indicating the elevation of the point of observation above the sea level as adjusted in metres.

As is well known the angle $\alpha$ by which the line of sight is inclined to the horizontal, if a target floating on the surface of the sea at the distance $x$ is observed from a point in the elevation $h$ above the sea level, is given with satisfactory exactness by $$tg\alpha = tg\alpha_0 + kx = \frac{h}{x} + kx$$

wherein $k$ is a constant depending of the curvature of the surface of the sea and of the average refraction, while $\alpha_0$ indicates the angle of sight regardless of the curvature of the sea surface and of the refraction.

A mechanism which has to furnish the true distances of the target must therefore give automatically a sum the first item of which is directly proportional to the elevation $h$ and inversely proportional to the distance $x$ to be measured while the second item must be directly proportional to this distance $x$.

The first item $tg\alpha_0 = \frac{h}{x}$ or $\log x = \log h - \log tg\alpha_0$ is furnished by a mechanical device in which a sighting telescope is adapted on the one hand to turn round a stationary horizontal axis (4) and on the other hand is supported by a cam (7) the radii of which follow the formula $$\zeta_7 = \zeta_0 + r^{\frac{h}{x}}$$

wherein $\zeta_0$ is a base circle radius necessary for merely practical reasons and $r$ is the constant distance between the axis of rotation (4) of the telescope and the cam support 16.

If now the cam has to obtain the same circular division as a range scale for any elevation $h$ above the sea level the angle $\varphi$ through which the cam is rotated must be determined for a given range or distance of the target by the equation $$a\phi = \frac{h}{x}$$

and therefore $$\phi = \frac{\log h - \log x}{\log a}$$

$a$ being a constant which is preferably so selected that the central angle of the cam surface is less than $2\pi$ for the extreme values of $h$ and $x$ desired. It then follows that also the scales for $h$ and $x$ may be united into one if, as already stated, for the numbering different units of length are selected for the elevations and for the distances that is to say if the elevations are counted by metres and the distances are counted by hundreds of metres, the central angle of the scale being likewise less than $2\pi$.

As the division for the angles $\varphi$ of rotation of the cam shows the difference $\log h - \log x$ it can be used in the same way as a calculating rule wound round a circle that is to say the adjustment $\log h$ of the scale relatively to a pointer rigidly connected to the cam for the given elevation $h$ above the sea level furnished on reading by means of a fixed pointer (20) on the same scale, the distance of the target as $\log x$ without taking into account the influence of the curvature of the surface of the sea and the average refraction.

Now in order to take mechanically into account this influence which is indeed rather insignificant and proportional to the distance $x$ of the target as a correction of the sighting angle, the journal pin of the said cam (7) is supported through the medium of a second cam (8) by a knife edge held in constant level. The latter cam must then correspond to the equation:

$$\zeta_8 = \zeta'_0 + kx$$

wherein $\zeta'_0$ is again a base circle radius selected only according to practical consideration and $k$ is the constant already referred to.

In view of the logarithmically divided range scale here must be $x = a\psi$ or the turning angle $\psi = \dfrac{\log x}{\log a}$ so that the polar equation of this cam is represented by $$\zeta_8 = \zeta'_0 + ka\psi$$

As the value of the correction term $ka\psi$ in the measuring of distances occurring in practice is only about 0.45 mm. the form of this cam will only slightly differ from that of a circle.

If the elevation of the point of observation above the level of the sea is below a value, depending on the exactness of the measuring, the range may be determined by means of the arrangement hereinafter described with the base on the target the cam and the range scale already present being used.

As is well known in this method of measuring a glass prism having an adjustable angle is placed in front of one half of the objective lens whereby in the field of vision of a double image will appear in which the two half images of the target appear to show a difference $h'$ in height depending on the angle $\gamma$ of the glass prism and of the refraction coefficient $n$ of the glass this difference being represented by $$h' = x tg\alpha' \text{ wherein } \alpha' = (n-1)\gamma$$

indicates the angle between the unrefracted pencil of light and the pencil of light having passed through the glass prism.

Assuming that this vertical displacement equal to known height of the target the distance of the target is given by $$x = \frac{h}{tg\gamma'}$$

wherein in view of the possibility of using a single scale for any height of the target met with in practice the active angle $\gamma$ of the prism must be likewise adjusted by a cam of the kind of the cam 7 by means of a logarithmically divided scale for here similarly as above $$tg\alpha' = \frac{h'}{x}$$

Hence without any further precaution the same cam which serves for adjusting the sighting angle may also be used for determining the angle of the glass prism, the same also the range scale and height scale. Only the arrangement of the indicator of the height of the target and the fixed angle between the latter and the indicator of the elevation above the sea level will depend of merely constructive conditions. For this purpose the arrangement shown in Figs. 6 and 7 can be substituted for that shown in Fig. 1. In substituting the optical system shown in Figs. 6 and 7 it is of course necessary to remove the objective end of the telescope 18 shown in Fig. 1. In Figs. 6 and 7, the telescope 18 is shown as broken away at approximately the same distance from the pivot 4 as is the break in the part 17. For adjusting the required angle of deflection $\alpha'$ there is provided as shown in Figs. 6 and 7 directly in front of the objective lens the meridionally cut half of a plane concave lens 22 in such a manner that it covers one lateral half of the objective lens. The centre of curvature of this plane concave lens is located exactly in the point of intersection of the optical axis with the axis of the two trunnions 4. In this point there is also located the centre of curvature of a plane convex lens 23 likewise meridionally cut which is so secured to the link 5 that its spherical surface is exactly in contact with the lens 22. It will be understood from the drawing that then the angle of deflection $\alpha'$ of the glass prism formed by the two plane surfaces of the half lenses depends on the inclination of the optical axis of the sighting telescope.

Now in order to permit the target located in the horizon to be observed notwithstanding this inclination, a pair of mirrors 24, 25 connected with the telescope is arranged in front of the deflecting system of lens halves, one of the mirrors 24 being inclined to the optical axis at an invariable angle of 45° while the inclination of the other mirror 25 may be adjusted by hand, by means of a handle 26ª to such an extent that the target located in the horizon, or in case of targets in the air even flying above the horizon appears in the field of vision of the telescope inclined downwardly.

By the arrangement hereinbefore described it is possible to determine the deflecting angle of the glass prism measuring the range by the inclination imparted to the telescope by means of the logarithmic circular scale and thus in exactly the same way as in the case of measuring with the use of the elevation above the sea level as a basis. From the analogy of the equations for the range it results that with this method of measuring the same distance or range scale may be used, but the pointer 26 to be adjusted for the height of the target is set at a certain constant angle relatively to the pointer 21 rigidly connected to the cam 7 for the elevation above the sea level, the value of such angle depending on the coefficient of refraction of the glass prism.

The handling of the instrument above described is the following:

If it is possible to observe the target from an exactly known and sufficiently great elevation above the sea level then after positioning exactly vertically the journal pin of the tripod head by means of the level 3ª mounted on the arm 3 the adjustment for the elevation above the sea level is made by the pointer 21 on the logarithmic circular division 19ª by turning the worm 11 the numbering of the circular scale indicating the elevation in meters. Then by turning the cam 7 by means of the handle 6ª the sight line is adjusted to the target, the glass prism 22, 23 having been removed, and the distance or range is read on the circular scale 19ª by means of the pointer 20 the numbering indicating in hundreds of meters.

If the point of observation is not at a sufficient elevation above the sea level for using its elevation as a basis of measurement, then for measuring the range a known or estimated height on the target must be resorted to. In this case again by means of the worm 11 this height is adjusted on the circular division by the target height pointer 27 and then after bringing into position the glass prism 22, 23 the sight is taken by means of the pair of mirrors 24, 25 by turning the latter mirror. Then there appears in the field of vision a superposed double image of the target. Now this superposition has to be so controlled by turning the journal pin 6 by means of the handle 6ª and the entering mirror 25 that the lower edge of one of the images exactly coincides with the upper edge of the second image of the target whereupon the distance or range in hundreds of metres may be read on the circular scale 19ª by means of the pointer 20.

What I claim is:

1. In a range finder for use on shore, the combination of a sighting telescope adapted to turn round a horizontal and a vertical axis, a cam adapted to support the telescope and to turn the same round the said horizontal axis, the radii of the said cam being an exponential function of the angle between a zero radius of the said cam any given radius thereof, a circular logarithmic division concentric with the said cam, an arm secured to such cam and carrying a pointer and means for turning the said arm around its axis for adjusting the pointer on the arm secured to the said cam on the said circular logarithmic division in accordance with the position of the range finder above the sea level and for adjusting the sighting telescope to the target, whereby the difference of the two angular positions of the cam, read on the logarithmic division, gives the logarithm of the range sought.

2. In a range finder for use on shore, the combination of a sighting telescope adapted to turn round a horizontal and a vertical axis, a cam adapted to support the telescope and to turn the same round the said horizontal axis, the radii of the said cam being an exponential function of the angle between a zero radius of the said cam and any given radius thereof, a circular logarithmic division concentric with the said cam, an arm secured to such cam and carrying a pointer and means for turning the said arm around its axis for adjusting the pointer on the arm secured to the said cam on the said circular logarithmic division in accordance with the position of the range finder above sea level and for adjusting the sighting telescope to the target, whereby the difference of the two angular positions of the cam, read on the logarithmic division, gives the logarithm of the range sought, a second cam coaxial with the first named cam and a support for the second named cam adapted to turn with the telescope round a vertical axis and to displace bodily both cams.

3. In a range finder for use on shore, the combination of a sighting telescope adapted to turn round a horizontal and a vertical axis, a cam adapted to support the telescope and to turn the same round the said horizontal axis, the radii of the said cam being an exponential function of the angle between a zero radius of the said cam and any given radius thereof, a circular logarithmic division concentric with the said cam, an arm secured to such cam and carrying a pointer and means for turning the said arm around its axis for adjusting the pointer on the arm secured to the said cam on the said circular logarithmic division in accordance with the position of the range finder above the sea level and for adjusting the sighting telescope to the target, whereby the difference of the two angular positions of the cam, read on the logarithmic division, gives the logarithm of the range sought, a second cam coaxial with the first-named cam and a support for the second named cam adapted to turn with the telescope round a vertical axis and to displace bodily both cams, the second named cam carrying the said logarithmic circular division and means comprising a worm gearing interposed between the first-named and the second-named cams for imparting to the circular logarithmic division the said adjustment for the position of the range finder above the sea level.

4. In a range finder for use on shore the combination of a sighting telescope adapted to turn round a horizontal and a vertical axis, a cam adapted to support the telescope and to turn the same round the said horizontal axis of the radii of the said cam being an exponential function of the angle between a zero radius of the said cam and any given radius thereof, a circular logarithmic division concentric with the said cam, an arm secured to such cam and carrying a pointer and means for turning the said cam around its axis for adjusting the pointer on the arm secured to the said cam on the said circular logarithmic division in accordance with the position of the range finder above the sea level and for adjusting the sighting telescope to the target, whereby the difference of the two angular positions of the cam, read on the logarithmic division, gives the logarithm of the range sought, a second cam coaxial with the first named cam and a support for the second-named cam adapted to turn with the telescope round a vertical axis and to displace bodily both cams, the second-named cam carrying the said circular logarithmic division, means for imparting to the circular logarithmic division an initial adjustment and a glass prism having an adjustable angle of deflection, in front of and covering one lateral half of the objective lens of the said telescope.

In testimony whereof I have signed my name to this specification.

KARL PETSCHENIG.